C. W. NOBLE.
STUD.
APPLICATION FILED JULY 22, 1907.

917,478.

Patented Apr. 6, 1909.

Witnesses:—
E. Cahill.
M. Cox.

Inventor,
Clarence W. Noble
By F. G. Fischer, Atty

UNITED STATES PATENT OFFICE.

CLARENCE W. NOBLE, OF WINNIPEG, MANITOBA, CANADA.

STUD.

No. 917,478.

Specification of Letters Patent.

Patented April 6, 1909.

Application filed July 22, 1907. Serial No. 385,085.

*To all whom it may concern:*

Be it known that I, CLARENCE W. NOBLE, a citizen of the United States, residing at Winnipeg, Province of Manitoba, Canada, have invented certain new and useful Improvements in Studs, of which the following is a specification.

My invention relates to improvements in studs for buildings, bridge-work, &c.; and one of my objects is to provide a device of this character which embodies great strength and rigidity so that it will successfully carry the loads and strains to which it is subjected.

A further object is to provide a member which is equally adapted for a variety of purposes, for instance, one that may be used in an upright position and perform the function of a stud by incorporating it in a solid or a hollow wall, or may be used in a horizontal position and perform the function of a joist or rafter by incorporating it in a ceiling.

A further object is to provide members which are so shaped that two or more may be readily spliced together without the use of extraneous fastening devices, when it is desired to use longer members than the standard lengths received from rolling-mills.

Figure 1:
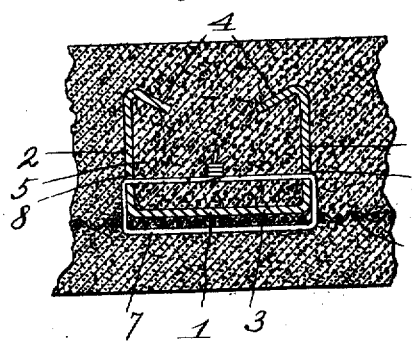
Figure 2:
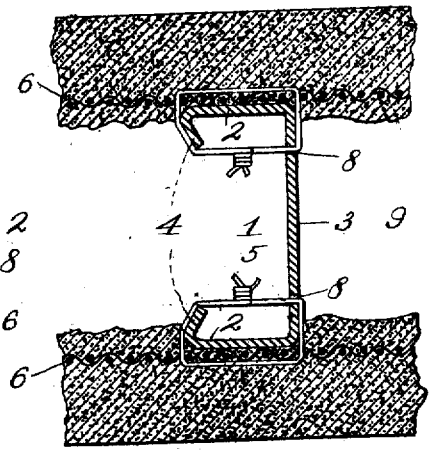
Figure 5:
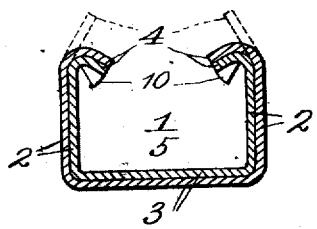
Figure 3:
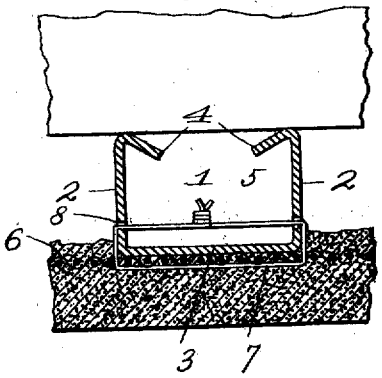
Figure 4:
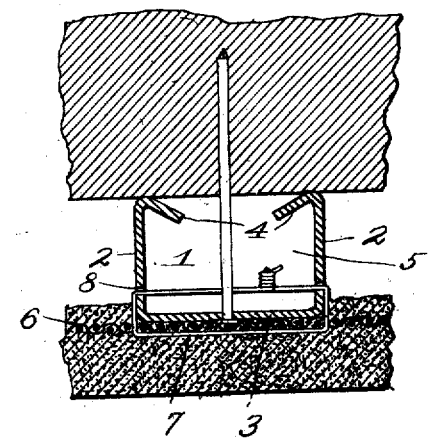

Referring now to the accompanying drawing, which illustrates the invention: Figure 1 shows one of the members incorporated in a solid partition wall. Fig. 2 shows the member incorporated in a hollow partition wall. Fig. 3 shows the member incorporated in a furred ceiling. Fig. 4 shows the member incorporated in a furred wall. Fig. 5 is a cross section of two members spliced together.

In the drawing the numeral 1 designates broadly my improved stud which is of sheet metal of sufficient thickness to render it practically non-resilient, and is preferably produced in suitable standard lengths and of a variety of sizes as different structural work may demand. In cross section it is substantially U-shaped as seen, consisting of a flat base turned upward at its edges at right angles into oppositely-disposed sides 2 of equal widths, and the latter at their free edges are bent inward at acute angles into narrow marginal flanges 4.

I prefer to use acute angles as shown, so that the flanges shall stand oblique to both sides and the base and also at an angle to each other—thereby producing by simple means a single stud having parts standing edgewise in four different planes, whereby the greatest possible strength is secured with the least amount of metal and the stud will resist strain in any direction which might cause it to buckle. The flanges 4, in addition to reinforcing the stud, partly close the open side of a pocket 5 formed therein, hence when the stud is embedded in a solid wall, as shown in Fig. 1, and the pocket becomes filled with part of the material of which the wall is constructed, said material will be held therein by the inturned flanges 4, and the stud and the wall will be firmly locked together.

6 designates a metal lath which may be secured to base 3, as shown in Figs. 1, 3, and 4, or to sides 2, as shown in Fig. 2, by fastening devices 7 consisting preferably of short lengths of wire. Said fastening devices are preferably passed through openings 8 in the member, but when it is desired to obtain the maximum strength of the latter said openings are omitted and the fastening devices are extended entirely around the member.

When the member is employed in the formation of a hollow wall having a wide air space 9, as shown in Fig. 2, the width of base 3 is increased so that sides 2, which carry the lath in this case, will be spread farther apart.

When it is desired to splice two members together, the marginal flanges on the first member are bent outwardly, as indicated by dotted lines Fig. 5, to receive the marginal flanges of the second member, which is turned to a corresponding position and slipped into the first the desired distance and then clamped therein by bending in the outturned marginal flanges on the first member. The members are further secured together by forming interlocking indentations or scallops 10 in their marginal flanges, as shown in Fig. 5.

From the above description it is apparent that I have produced a device containing all the features of advantage above enumerated.

Having thus described my invention, what I claim is:—

A compound stud comprising two like members standing in corresponding positions and telescoped one into the other, each consisting of a substantially U-shaped body with inturned marginal flanges at the free edges of its sides, and interlocking indentations formed in said flanges.

In testimony whereof I affix my signature in the presence of two witnesses.

CLARENCE W. NOBLE

Witnesses:
BESSIE FRYER,
P. J. PROCTER.